United States Patent
Hollis et al.

(10) Patent No.: US 10,834,024 B2
(45) Date of Patent: Nov. 10, 2020

(54) SELECTIVE MULTICAST DELIVERY ON A BUS-BASED INTERCONNECT

(71) Applicant: International Business Machines Corporation, Armonk, NY (US)

(72) Inventors: Simon J. Hollis, San Jose, CA (US); Hartmut Penner, San Jose, CA (US); Andrew S. Cassidy, San Jose, CA (US); Jun Sawada, Austin, TX (US); Pallab Datta, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/147,198

(22) Filed: Sep. 28, 2018

(65) Prior Publication Data
US 2020/0106717 A1 Apr. 2, 2020

(51) Int. Cl.
*G06F 15/16* (2006.01)
*H04L 12/931* (2013.01)
*G06N 3/02* (2006.01)
*H04L 12/18* (2006.01)

(52) U.S. Cl.
CPC .......... *H04L 49/201* (2013.01); *G06N 3/02* (2013.01); *H04L 12/18* (2013.01)

(58) Field of Classification Search
CPC .......... G06N 3/04; G06N 5/046; G06N 5/047; H04L 49/201
See application file for complete search history.

(56) References Cited

U.S. PATENT DOCUMENTS

| | | | |
|---|---|---|---|
| 8,384,544 B2 | 2/2013 | Vrba et al. | |
| 8,953,574 B2 | 2/2015 | Schrum, Jr. et al. | |
| 9,432,698 B2 | 8/2016 | Ramesh et al. | |
| 9,462,064 B2 | 10/2016 | Dorairaj | |
| 9,710,265 B1* | 7/2017 | Temam | G06N 3/04 |
| 9,853,822 B2 | 12/2017 | Wijnands et al. | |
| 10,140,252 B2* | 11/2018 | Fowers | G06F 17/16 |
| 2018/0046895 A1 | 2/2018 | Xie et al. | |
| 2018/0139153 A1* | 5/2018 | Moradi | G06N 3/049 |

OTHER PUBLICATIONS

Xilinx, "UltraRAM: Breakthrough Embedded Memory Integration on UltraScale+ Devices," Xilinx, White Paper: UltraScale+ Devices, WP477 v1.0, Jun. 14, 2016, pp. 1-11.

* cited by examiner

*Primary Examiner* — Cheikh T Ndiaye
(74) *Attorney, Agent, or Firm* — Zilka-Kotab, P.C.

(57) ABSTRACT

According to one embodiment, a computer program product for performing selective multicast delivery includes a computer readable storage medium having program instructions embodied therewith, wherein the computer readable storage medium is not a transitory signal per se, and where the program instructions are executable by a selector of an intelligent processing unit (IPU) to cause the selector to perform a method comprising identifying, by the selector, an address header appended to an instance of data, comparing, by the selector, address data in the address header to identifier data stored at the selector, and conditionally delivering, by the selector, the instance of data, based on the comparing.

20 Claims, 15 Drawing Sheets

SELECTIVE MULTICAST DELIVERY ON A BUS-BASED INTERCONNECT

BACKGROUND

The present invention relates to neural inference processing devices, and more specifically, this invention relates to implementing data distribution within a neural inference processing device.

In machine learning inference tasks, there are lots of repeated operations on the same data (in the form of repeated instructions), as well as repeated input values (in the form of repeated weights), and shared data (in the form of duplicated activations). These repetitions can be efficiently supported by broadcast communication of instructions and weights. However, current implementations fail to efficiently and effectively provide broadcast support during data distribution within a neural inference processing device.

SUMMARY

According to one embodiment, a computer program product for performing selective multicast delivery includes a computer readable storage medium having program instructions embodied therewith, wherein the computer readable storage medium is not a transitory signal per se, and where the program instructions are executable by a selector of an intelligent processing unit (IPU) to cause the selector to perform a method comprising identifying, by the selector, an address header appended to an instance of data, comparing, by the selector, address data in the address header to identifier data stored at the selector, and conditionally delivering, by the selector, the instance of data, based on the comparing.

According to another embodiment, a neural inference processing unit is provided for performing neural network inference, where data is distributed to one or more destinations in the neural inference processing unit, and where the neural inference processing unit executes a method including identifying, by a selector within the neural inference processing unit, an address header appended to an instance of data, comparing, by the selector within the neural inference processing unit, address data in the address header to identifier data stored at the selector, and conditionally delivering, by the selector within the neural inference processing unit, the instance of data, based on the comparing.

According to another embodiment, a system includes a processor, and logic integrated with the processor, executable by the processor, or integrated with and executable by the processor, where the logic is configured to identify, by a selector, an address header appended to an instance of data, compare, by the selector, address data in the address header to identifier data stored at the selector, and conditionally deliver, by the selector, the instance of data, based on the comparing.

Other aspects and embodiments of the present invention will become apparent from the following detailed description, which, when taken in conjunction with the drawings, illustrate by way of example the principles of the invention.

DETAILED DESCRIPTION

Figure 1:
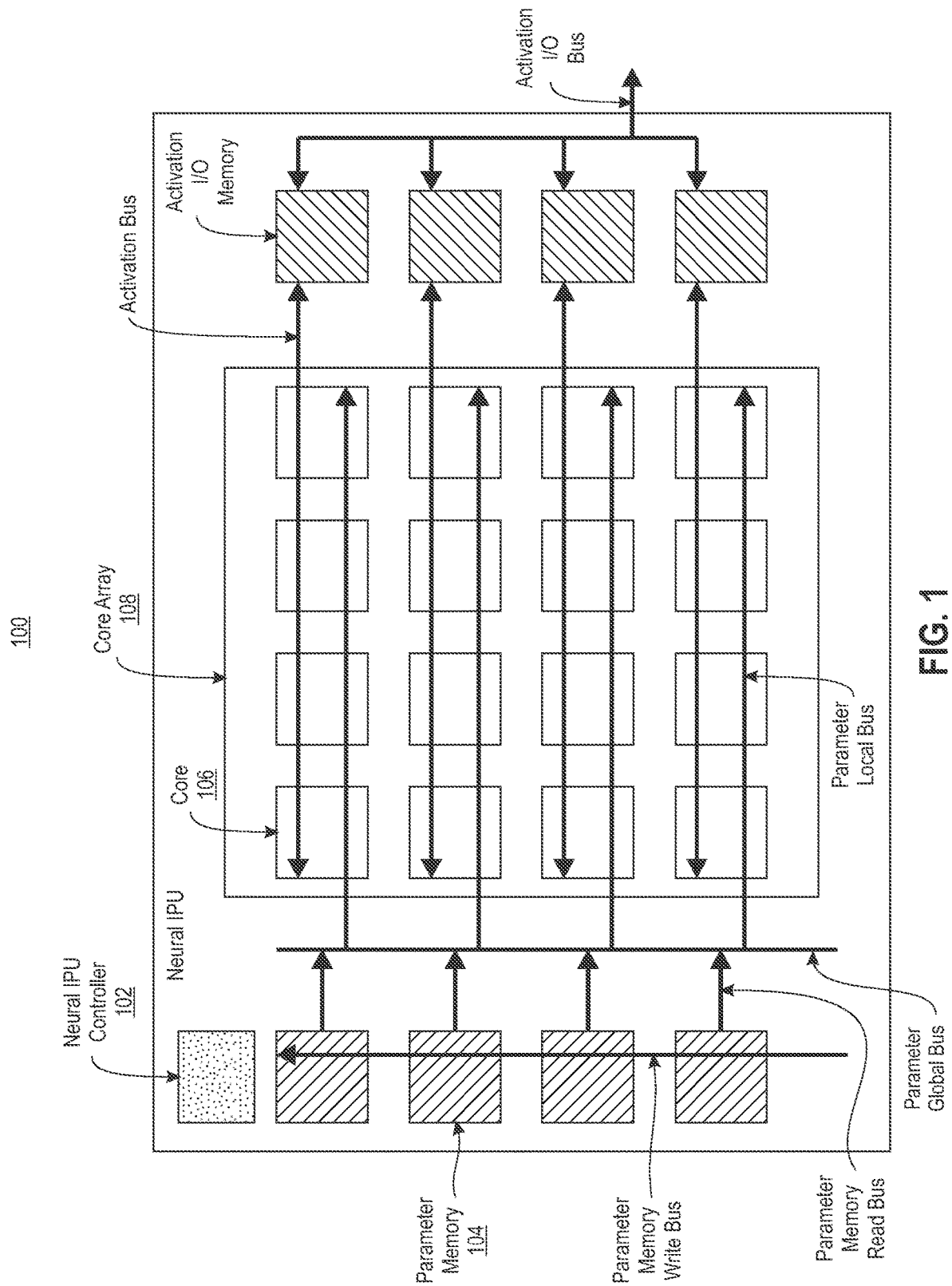
FIG. 1 illustrates a neural IPU architecture, in accordance with one embodiment.

The following description discloses several preferred embodiments of systems, methods and computer program products for performing selective multicast delivery on a bus-based interconnect. Various embodiments provide a method to compare address data in an address header to identifier data stored at a selector, and conditionally deliver data based on the comparison.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing selective multicast delivery on a bus-based interconnect.

In one general embodiment, a computer program product for performing selective multicast delivery includes a computer readable storage medium having program instructions embodied therewith, wherein the computer readable storage medium is not a transitory signal per se, and where the program instructions are executable by a selector of an intelligent processing unit (IPU) to cause the selector to perform a method comprising identifying, by the selector, an address header appended to an instance of data, comparing, by the selector, address data in the address header to identifier data stored at the selector, and conditionally delivering, by the selector, the instance of data, based on the comparing.

In another general embodiment, a neural inference processing unit is provided for performing neural network inference, where data is distributed to one or more destinations in the neural inference processing unit, and where the neural inference processing unit executes a method including identifying, by a selector within the neural inference processing unit, an address header appended to an instance of data, comparing, by the selector within the neural inference processing unit, address data in the address header to identifier data stored at the selector, and conditionally delivering, by the selector within the neural inference processing unit, the instance of data, based on the comparing.

In another general embodiment, a system includes a processor, and logic integrated with the processor, executable by the processor, or integrated with and executable by the processor, where the logic is configured to identify, by a selector, an address header appended to an instance of data, compare, by the selector, address data in the address header to identifier data stored at the selector, and conditionally deliver, by the selector, the instance of data, based on the comparing.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor slice is a subset of the elements in a tensor.

Each neural network layer is associated with a weight tensor, neuron parameter tensor, input tensor, output tensor, and intermediate tensor. The weight tensor contains all of the weights that connect inputs to the layer. The neuron parameter tensor contains all of the parameters that control neuron activation functions in the layer. The input tensor contains all of the data that the layer consumes as input. The output tensor contains all of the data that the layer computes as output. The intermediate tensor contains any data that the layer produces as intermediate computations, such as partial sums.

A neural core is a tileable computational unit that computes one slice of an output tensor. Multiple neural cores may be tiled in a neural core array, typically 2-dimensional.

A neural network model is a set of constants that collectively specify the entire computation performed by a neural network, including the graph of connections between neurons as well as the weights and activation function parameters for every neuron. This overall set of constants, including weights, neuron parameters, functions, and other constants are called parameter data. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

FIG. 1 illustrates a neural IPU architecture 100, in accordance with one embodiment. As shown in FIG. 1, in order to configure the neural intelligent processing unit (IPU), instructions are loaded into a neural IPU controller 102, and neural network parameter data is loaded into parameter memory 104.

For every input frame, a neural inference is computed. More specifically, input activation data is sent into the neural IPU, where it is distributed to one or more cores 106 within a core array 108. Additionally, neural network parameter data is distributed to the cores 106. One or more cores 106 in the core array 108 perform neural inference computations, and the output activation data from the cores 106 is aggregated and read from the neural IPU.

Figure 2:
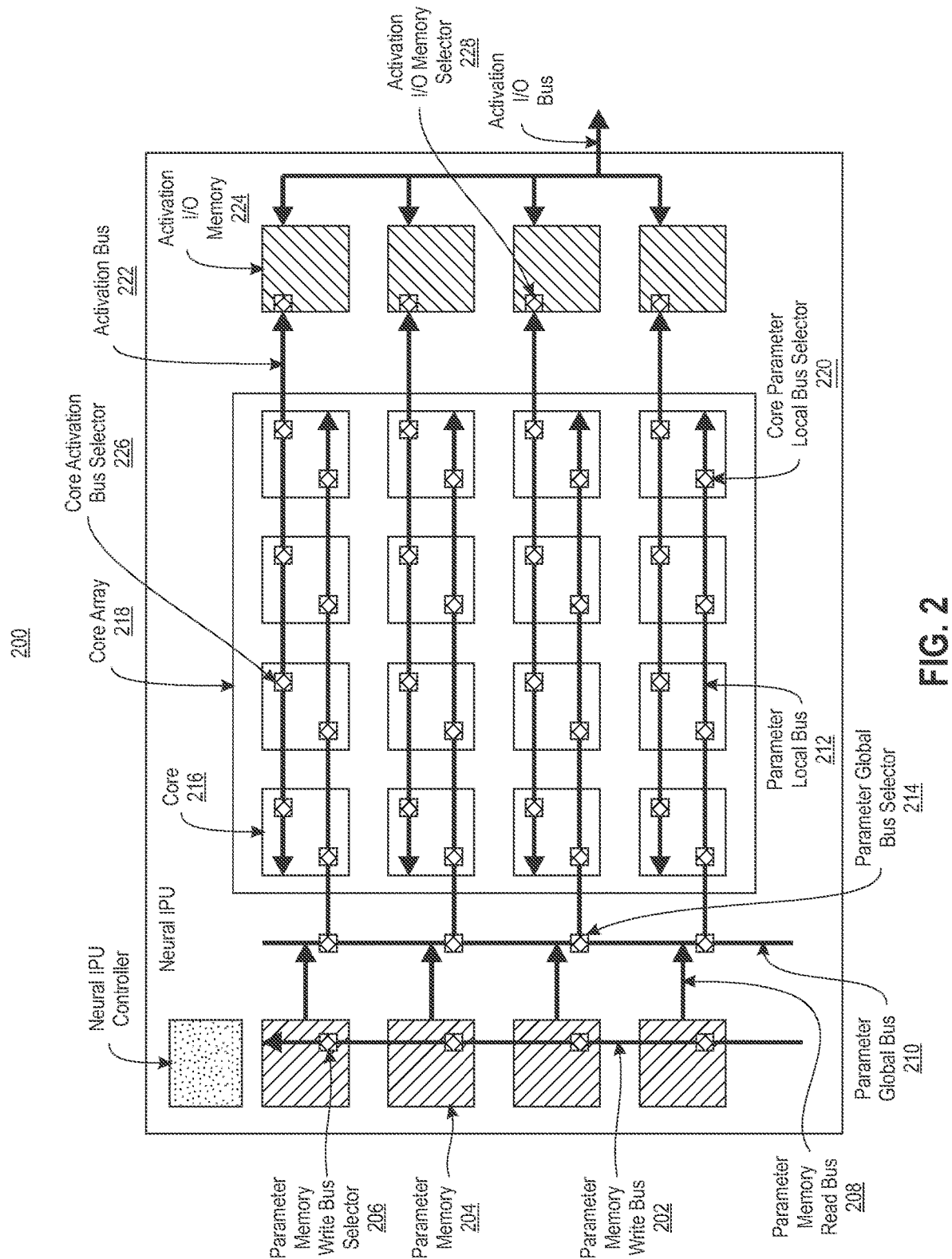
FIG. 2 illustrates a neural IPU architecture with multicast distribution buses, in accordance with one embodiment.

FIG. 2 illustrates a neural IPU architecture with multicast distribution buses 200, in accordance with one embodiment. As shown in FIG. 2, a parameter memory write bus 202 is a multicast bus that sends write data into parameter memories 204. Additionally, a parameter memory write bus selector 206 selects data from the parameter memory write bus 202 to write into a memory bank.

Additionally, a parameter memory read bus 208 is a unicast bus that sends parameters from a single parameter memory 204 to a parameter global bus 210. The parameter global bus 210 is a multicast bus that sends parameters from parameter memory read buses 208 to parameter local buses 212. A parameter global bus selector 214 selects data from the parameter global bus 210 to send to a given row of a parameter local bus 212.

Further, the parameter local bus 212 is a multicast bus that sends parameters to cores 216 in a core array 218. A core parameter local bus selector 220 selects data from the parameter local bus 212 to send to a given core 216. An activation data bus 222 is a multicast bus that sends activation data between cores 216 and activation I/O memories 224. A core activation bus selector 226 selects data from an activation bus to send to a given core 216.

In one embodiment, parameters are loaded in the parameter memories 204 via the parameter memory write bus 202 and the parameter memory write bus selectors 206. Parameters are then loaded into the cores 216. For example, parameters are read from a parameter memory 204 via a parameter memory read bus 208. Parameters are distributed by the parameter global bus 210. Parameters are selected for a set of parameter local buses 212 by the parameter global bus selectors 214. Parameters are distributed along the selected set of parameter local buses 212. Parameters are loaded into the cores 216 via the core parameter local bus selectors 220.

Additionally, in one embodiment, activation data is loaded into the cores 216 from the activation I/O memories 224 via the activation data bus 222 and the core activation bus selectors 226. The activation data is sent between cores 216 via the activation data bus 222 and the core activation bus selectors 226. Activation data is sent from the cores 216 to the activation I/O memories 224 via the activation data bus 222 and the activation I/O memory selectors 228.

Figure 3:
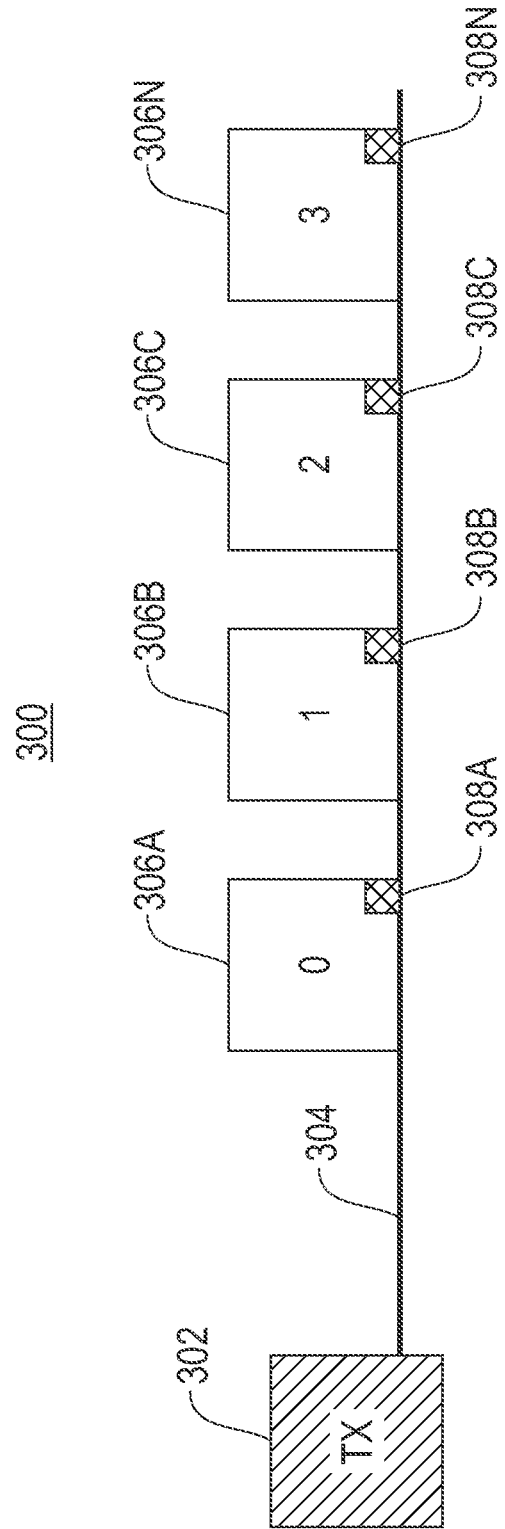
FIG. 3 illustrates a single multicast bus, in accordance with one embodiment.

FIG. 3 illustrates a single multicast bus 300, in accordance with one embodiment. As shown in FIG. 3, the single multicast bus 300 includes a transmitter 302 that sends data and an address header onto a multicast bus 304. The transmitter may include a memory a processor, a core, a logic function unit, etc.

Additionally, data is selected from the multicast bus 304 and is delivered to one or more receivers 306A-N by one or more respective selectors 308A-N. Each of the receivers 306A-N may include a memory, a processor, a core, a logic function unit, etc.

Figure 4:
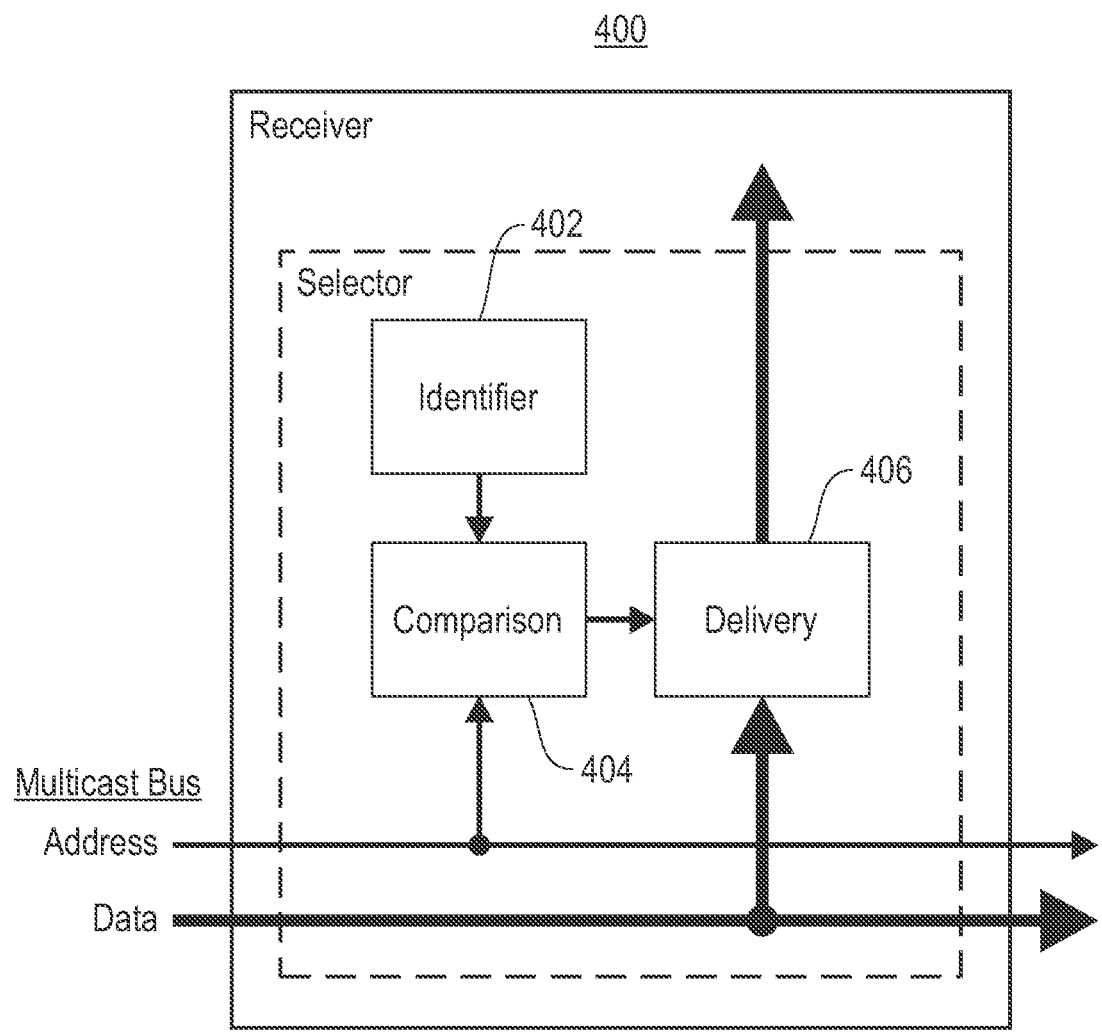
FIG. 4 illustrates a selector block diagram, in accordance with one embodiment.

FIG. 4 illustrates a selector block diagram 400, in accordance with one embodiment. As shown in FIG. 4, the selector block diagram 400 includes an identifier function 402, a comparison function 404, and a delivery function 406. Functionality of the selector block diagram 400 is illustrated with respect to the flowchart shown in FIG. 5.

Figure 5:
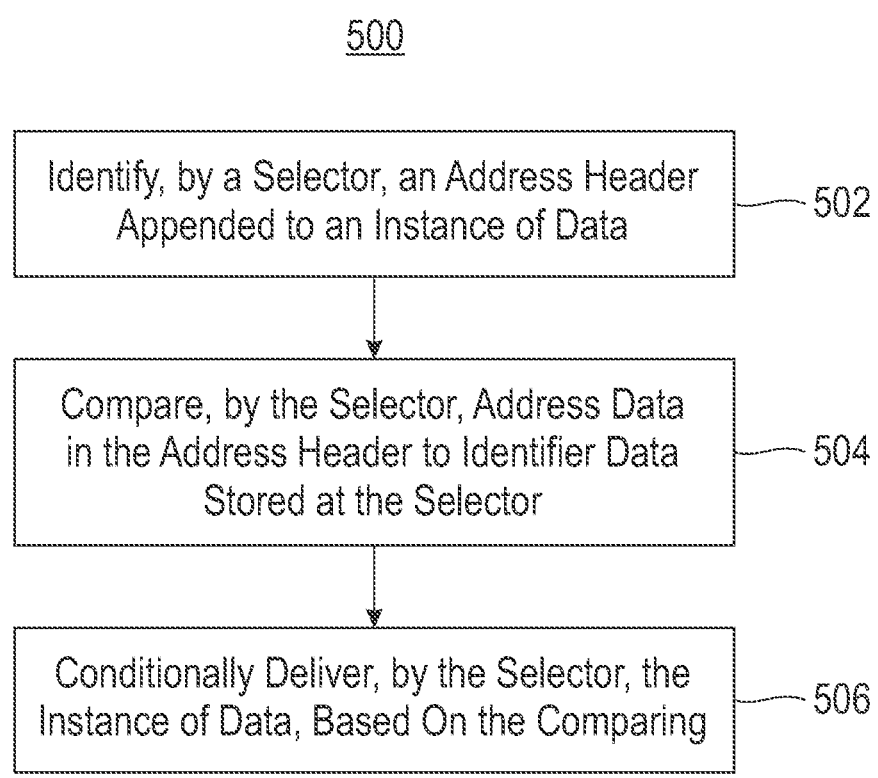
FIG. 5 illustrates a method for performing selective multicast delivery on a bus-based interconnect, in accordance with one embodiment.

Now referring to FIG. 5, a flowchart of a method 500 is shown according to one embodiment. The method 500 may be performed in accordance with the present invention in any of the environments depicted in FIGS. 1-4, 6, 8, 12, and 14, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be used to distribute multiple types of data (e.g. parameter, activation) in a Neural IPU. Also used to distribute data across multiple IPU sources and destinations (parameter memory, cores, activation memory, other buses, etc.) as shown in FIG. 1.

In other embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an address header appended to an instance of data is identified by a selector. The selector may include a device on a multi-cast bus that identifies, compares, and conditionally sends data. For example, an identifier function 402 shown in FIG. 4 may perform the identification of the address header. In one embodiment, the instance of data and the address header may be received at the selector. In another embodiment, the selector may be one of a plurality of selectors implemented within a neural inference processing device (e.g., a neural inference chip, etc.). For example, the neural inference processing device may include a hardware processor with one or more memory locations and one or more processing cores.

Additionally, in one embodiment, the instance of data may be sent from a memory within the neural inference processing device. For example, the instance of data may be sent from one or more memory locations to one or more cores via the selector at runtime. In another embodiment, the selector may include a global bus selector. For example, a global bus selector may be located on a global bus of the neural inference processing device and may determine whether to pass incoming instances of data to a local bus associated with the global bus selector.

Further, in one embodiment, the selector may include a core selector. For example, a core selector may be located on a local bus of the neural inference processing device and may determine whether to pass incoming instances of data to a processing core associated with the core selector. In another embodiment, the instance of data may include a portion of a neural network model. In yet another embodiment, the instance of data may include any computational value, including, but not limited to: instructions, data, debugging information, weights, results, etc.

For example, with reference to FIG. 2, in one embodiment, the instance of data may be sent from one or more parameter memories 204 to one or more cores 216 via a parameter global bus selector 214 and a core parameter local bus selector 220 at runtime.

Further still, in one embodiment, the address header may include one or more bits. For example, the address header may include a negation bit, an OR/AND combiner bit, and one or more boolean flag selection bits. In another example, the address header may include a single identifier comprising one or more bits. In yet another example, the address header may include a single location identifier comprising one or more bits. In still another example, the address header may include an ID flag vector comprising a plurality of bits.

Also, method 500 may proceed with operation 504, where address data in the address header is compared by the selector to identifier data stored at the selector. For example, a comparison function 404 shown in FIG. 4 may perform the comparison of the address data in the address header to the identifier data stored at the selector. In one embodiment, the identifier data may include one or more bits stored at the selector. For example, the identifier data may include an ID flag comprising a plurality of bits. For instance, the ID flag may be assigned to the selector from a finite pool of ID flags.

In another example, the identifier data may include a set of one or more numeric IDs. For instance, each of the numeric IDs may comprise one or more bits, and one or more of the numeric IDs may be assigned to/stored by multiple different selectors. In yet another example, the identifier data may include an ID lookup table (LUT). For instance, the ID LUT may include a plurality of locations, where each location includes a binary value (true or false). In still another example, the identifier data may include a single identifier. For instance, the single identifier may include one or more bits.

In addition, in one embodiment, the comparing may be performed utilizing configurable logic implemented in hardware of the neural inference processing device. In another embodiment, the comparing may include performing boolean matching. For example, the comparing may include performing boolean matching between one or more boolean flag selection bits within the address header appended to the instance of data and the ID flag stored at the selector. In another example, a negation bit and an OR/AND combiner bit located within the address header may be used during the boolean matching.

Furthermore, in one embodiment, the comparing may include performing a lookup. For example, a lookup may be performed within one or more numeric IDs stored at the selector for a single identifier within the address header appended to the instance of data. In another example, a lookup may be performed for a location within an ID LUT stored at the selector that is indicated by a single location identifier within the address header appended to the instance of data. In yet another example, a lookup may be performed for a location within an ID flag vector appended to the instance of data that is indicated by a single identifier stored at the selector.

Further still, method 500 may proceed with operation 506, where the selector conditionally delivers the instance of data, based on the comparing. In one embodiment, delivering the instance of data may include passing the instance of data to another bus. For example, the selector may include a global selector located on a global bus, and delivering the instance of data may include passing the instance of data to a local bus associated with the global bus selector.

Also, in one embodiment, delivering the instance of data may include passing the instance of data to a processing core. For example, the selector may include a core selector located on a local bus, and delivering the instance of data may include passing the instance of data to a processing core associated with the core selector. The instance of data may then be processed by the processing core.

Additionally, in one embodiment, the instance of data may be delivered in response to determining that the comparing results in a match. For example, if the boolean matching results in a match at the selector, the selector may deliver the instance of data. In another example, if the boolean matching does not result in a match at the selector, the selector may not deliver the instance of data.

Further, in one embodiment, the instance of data may be delivered in response to determining that a single identifier within the address header appended to the instance of data is found within one or more numeric IDs stored at the selector. For example, the instance of data may not be delivered in response to determining that a single identifier within the address header appended to the instance of data is not found within one or more numeric IDs stored at the selector.

Further still, in one embodiment, the instance of data may be delivered in response to determining that a location within an ID LUT stored at the selector that is indicated by a single location identifier within the address header appended to the instance of data has a boolean value of true. For example, the instance of data may not be delivered in response to determining that a location within an ID LUT stored at the selector that is indicated by a single location ID within the address header appended to the instance of data has a boolean value of false.

Also, in one embodiment, the instance of data may be delivered in response to determining that a location within an ID flag vector appended to the instance of data that is indicated by a single identifier stored at the selector has a boolean value of true. For example, the instance of data may not be delivered in response to determining that a location within an ID flag vector appended to the instance of data that is indicated by a single identifier stored at the selector has a boolean value of false.

In addition, in one embodiment, all or a portion of the address header may be removed before delivering the instance of data. For example, the address header may include a first portion and a second portion, and the first portion of the address header may be removed by a first selector (e.g., a global bus selector, etc.) before delivering the instance of data and the second portion of the address header to a second selector (e.g., a core local bus selector, etc.). In this way, multi-dimensional distribution of data may be enabled within the neural inference processing device.

In this way, decision making for data routing/delivery within a neural inference processing device may be distributed amongst a plurality of selectors implemented within the neural inference processing device. Additionally, a number of transactions required to send data to processing cores within the neural inference processing device may be reduced/minimized, which may improve a performance of the neural inference processing device. Further, a complexity of encodings made by a compiler for implementation by the neural inference processing device may be reduced. Further still, a multi-dimensional distribution of data may be supported within the neural inference processing device.

Figure 6:
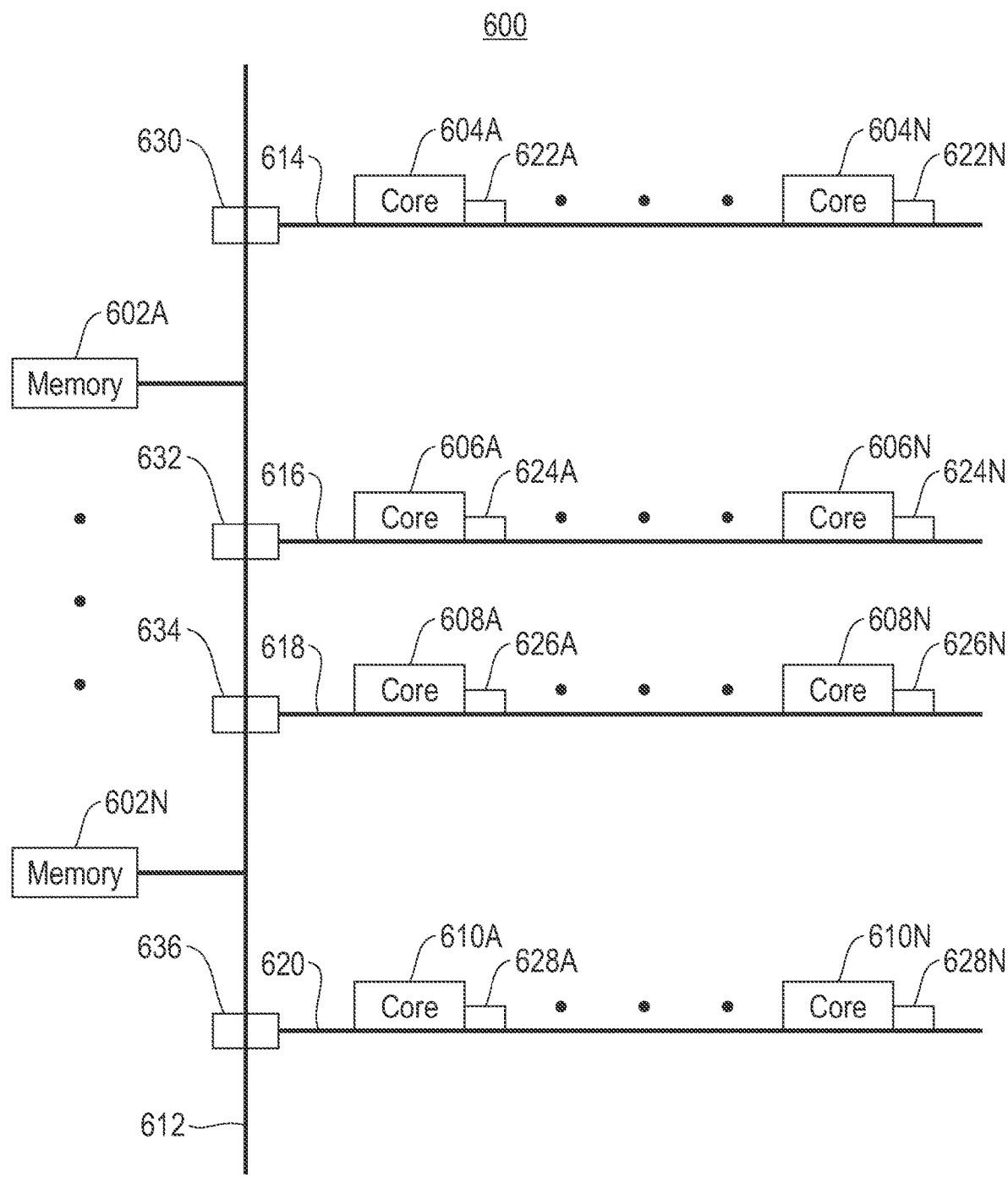
FIG. 6 illustrates an exemplary neural inference processing device, in accordance with one embodiment.

FIG. 6 illustrates an exemplary neural inference processing device 600, according to one exemplary embodiment. As shown, the neural inference processing device 600 includes a plurality of memory locations 602A-N located on a global bus 612, as well as a first plurality of processing cores 604A-N located on a first local bus 614, a second plurality of processing cores 606A-N located on a second local bus 616, a third plurality of processing cores 608A-N located on a third local bus 618, and a fourth plurality of processing cores 610A-N located on a fourth local bus 620.

Additionally, each of the first plurality of processing cores 604A-N has a corresponding core selector 622A-N, each of the second plurality of processing cores 606A-N has a corresponding core selector 624A-N, each of the third plurality of processing cores 608A-N has a corresponding core selector 626A-N, and each of the fourth plurality of processing cores 610A-N has a corresponding core selector 628A-N.

Further, a first global bus selector 630 is located at the intersection of the global bus 612 and the first local bus 614. A second global bus selector 632 is located at the intersection of the global bus 612 and the second local bus 616. A third global bus selector 634 is located at the intersection of the global bus 612 and the third local bus 618. A fourth global selector 636 is located at the intersection of the global bus 612 and the fourth local bus 620.

Further still, in one embodiment, a header is appended to an instance of data read from one or more of the memory locations 602A-N, and the instance of data and associated header are send to the global bus 612. Based on results of a comparison of information in the header to information stored at each of the global bus selectors 630-636, the instance of data and at least a portion of the header are sent to one or more of the local buses 614-620.

For example, if a comparison of information in the header to information stored at the first global bus selector 630 results in a match, the instance of data and at least a portion of the header are sent by the first global bus selector 630 to the first local bus 614. In another example, if a comparison of information in the header to information stored at the second global bus selector 632 results in a match, the instance of data and at least a portion of the header are not sent by the second global bus selector 632 to the second local bus 616.

In one embodiment, upon sending the instance of data to by the first global bus selector 630 to the first local bus 614, the first global bus selector 630 may remove a first portion of the header, leaving only a second portion of the header appended to the instance of data that is sent to the first local bus 614. Once on the first local bus 614, the second portion of the header appended to the instance of data is identified by each of the core local bus selectors 622A-N located on the first local bus 614, and is compared by each of the core local bus selectors 622A-N to information stored at each of the core local bus selectors 622A-N.

Based on the results of the comparison, the instance of data is sent to one or more of the processing cores 604A-N. For example, if a comparison of information in the second portion of the header to information stored at the first core local bus selector 622A results in a match, the instance of data is sent by the first core local bus selector 622A to its associated core 604A to be processed. In another example, if a comparison of information in the second portion of the header to information stored at the Nth core local bus selector 622N does not result in a match, the instance of data is not sent by the Nth core local bus selector 622N to its associated core 604N to be processed.

In this way, data may be directed from the plurality of memory locations 602A-N to processing cores 604A-N, 606A-N, 608A-N, and 610A-N in response to decisions made at global bus selectors 630-636 and core local bus selectors 622A-N, 624A-N, 626A-N, and 628A-N.

Filtering by Boolean Matching

Figure 7:
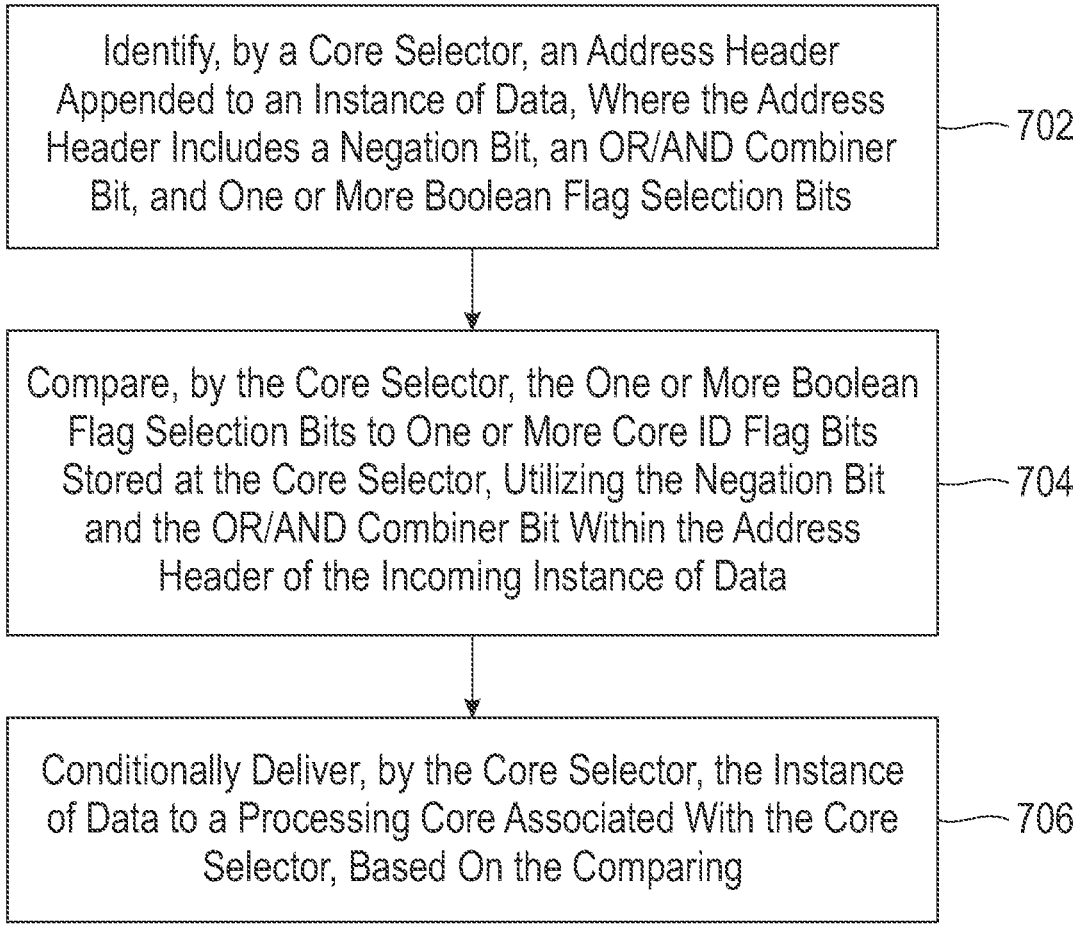
FIG. 7 illustrates a method for performing filtering using boolean matching, in accordance with one embodiment.

Now referring to FIG. 7, a flowchart of a method 700 for performing filtering using boolean matching is shown according to one embodiment. The method 700 may be performed in accordance with the present invention in any of the environments depicted in FIGS. 1-4, 6, 8, 12, and 14, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where an address header appended to an instance of data is identified by a core selector, where the address header includes a negation bit, an OR/AND combiner bit, and one or more boolean flag selection bits. Additionally, method 700 may proceed with operation 704, where the core selector compares the one or more boolean flag selection bits to one or more core ID flag bits stored at the core selector, utilizing the negation bit and the OR/AND combiner bit within the address header of the incoming instance of data. Further, method 700 may proceed with operation 706, where the core selector conditionally delivers the instance of data to a processing core associated with the core selector, based on the comparing.

In one embodiment, a core selector for each core is assigned an ID flag set from a small, finite pool of flags. Each flag within the flag set may comprise one boolean flag selection bit (e.g., N, E, S, W, C, etc.) representative of a group of cores. In another embodiment, each core may be a member of multiple groups, as indicated by the ID flag set stored at its associated core selector.

Additionally, in one embodiment, data is distributed with an address header via a broadcast to all cores on a multicast bus. In another embodiment, boolean operators are included in the address header to indicate which cores are targets for the instructions. Further, in one embodiment, a first bit in the address header may include a negation bit, a second bit in the address header may include an OR/AND combiner bit, and a plurality of remaining bits may include boolean flag selection bits. For example, a header may include a negation bit, followed by an OR/AND combiner bit, followed by five boolean flag selection bits (N, E, S, W, C) each representative of a group of cores.

In another example, if the negation bit has a value of zero, the OR/AND combiner bit has a value of zero, and the five boolean flag selection bits (N, E, S, W, C) have a value of 10100, the address header indicates that all cores in "N" and "S" core groups are to receive the instance of data. In yet another example, if the negation bit has a value of one, the OR/AND combiner bit has a value of one, and the five boolean flag selection bits (N, E, S, W, C) have a value of 01001, the address header indicates that all cores except those in both "E" and "C" core groups are to receive the instance of data.

Boolean Algebra for a Filtering System

In one embodiment, to improve software usability, the system may perform the following operations (Boolean definition):

'OR combiner operation'—defined as, "One or more bit(s) in the destination core's ID flag set match(es) one or more bit(s) in the address header 'AND combiner operation'—defined as, "All bits set in the address header must also be set in the destination's ID flag set. However, additional bits may be set in the destination, and the AND expression still matches"

Table 1 illustrates exemplary boolean algebra used to implement a filtering system. Of course, it should be noted that the boolean algebra shown in Table 1 is set forth for illustrative purposes only, and thus should not be construed as limiting in any manner.

TABLE 1

OR operation:
   accept_instr = $\bigvee_i$(instr_ID_flags(i) $\wedge$ core_flags(i))
   accept_instr = OR_reduce_i(instr_ID_flag(i) AND core_flags(i))
AND operation:
   accept_instr = $\neg \bigvee_i$ (instr_ID_flags(i) $\wedge$ ($\neg$core_flags(i)))
   accept_instr = NOT OR_reduce_i(instr_ID_flags(i) AND (NOT core_flags(i)))
AND operation (equivalent by De Morgan's Law):
   accept_instr = $\bigwedge_i$(($\neg$instr_ID_flags(i)) $\vee$ core_flags(i))
   accept_instr = AND_reduce_i((NOT instr_ID_flags(i)) OR core_flags(i))

Figure 8:
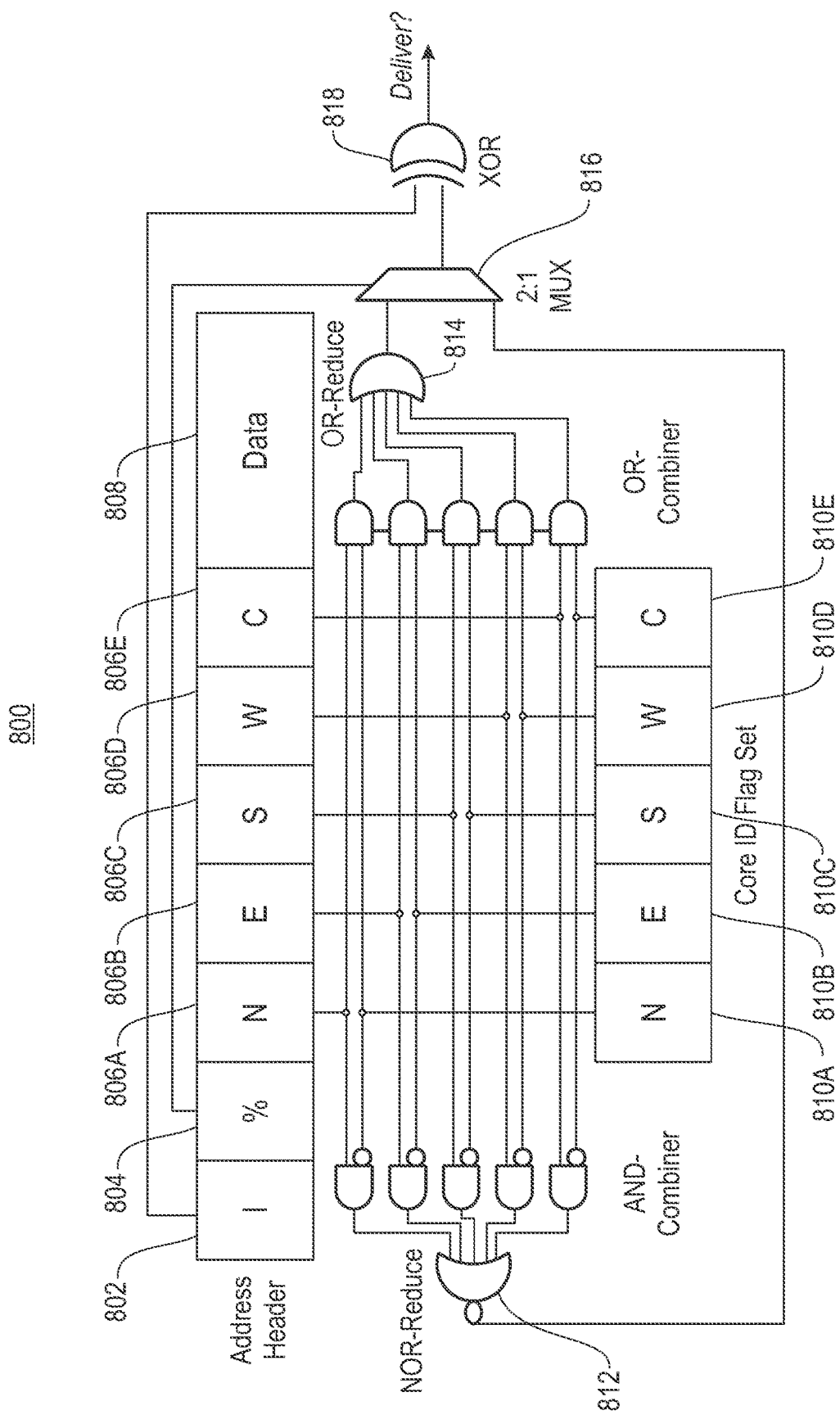
FIG. 8 illustrates exemplary hardware logic to implement filtering by boolean matching, in accordance with one embodiment.

FIG. 8 illustrates exemplary hardware logic 800 to implement filtering by boolean matching, according to one exemplary embodiment. As shown, an address header including a negation bit 802, an OR/AND combiner bit 804, and boolean flag selection bits 806A-N are appended to an instance of data 808. Additionally, a plurality of core ID flag bits 810A-E are stored within a core selector of a neural inference processing device. These core ID flag bits 810A-E may indicate in which of a plurality of different groups a core associated with the core selector is included.

Further, logic including a NOR-reduce 812, an OR-reduce 814, a 2:1 multiplexer 816, and an XOR 818 is implemented within hardware of the core selector.

In one embodiment, the address header 802-804 and the instance of data 808 are sent from a memory of a neural inference processing device to the core selector of the neural inference processing device. Additionally, the logic 812-816 implemented within the hardware of the core selector is used to perform boolean matching between the address header 802-804 and the core ID flag bits 810A-E stored within the core selector. Based on the boolean matching, a determination is made whether to deliver the instance of data 808 to a processing core associated with the core selector.

In this way, a large number of processing cores may be addressed in a single transaction. Additionally, a decode overhead for receiving processing cores may be reduced. Further, messages may easily be pruned by a core flag/group aware router.

Additionally, in one embodiment, a number of bits may be determined for use as boolean flag selection bits. A number of bits may be adjusted based on a number of processing cores on a bus. For example, a unique addressing of cores for later layers may be needed, and group-based addressing of cores for shared code may be implemented. In another embodiment, if 16 processing cores are located on a multicast bus, 6 bits may be used for unique addressing in a 'one hot' scheme, and 4 bits may be used for group membership, resulting in 10 total bits used for boolean flag selection bits. A negation bit and an OR/AND combiner bit are added, for a total address size of 12 bits.

Further, in one embodiment, different coding schemes may be implemented for using the boolean flag selection bits in the address header. For example, data may be sent to specific individual processing cores (e.g., using a unique ID, etc.), and/or to one or more selective groups (e.g., using selective multicast bits). This may enable different levels of granularity within a single boolean flag selection bit vector. In another embodiment, as shown in the above example, six addresses may be obtained from a 'one hot' scheme of length six ({100000, 010000, . . . 000001}). Likewise, five addresses may be obtained from a 'one hot' scheme of length five, with the sixth bit set to one. By induction, four addresses may be obtained from a scheme of length four, three addresses may be obtained from a scheme of length three, and two addresses may be obtained from a scheme of length two.

Further still, in one embodiment, a plurality of bits (e.g., four bits, etc.) may be used in the address header for selective multicast. For example, one or more 'group' flag(s) is set for each core, and instructions may target membership of multiple or a set of groups with the AND/OR mechanism.

In this way, a hardware mechanism may filter delivery based on a Boolean matching function between ID flag set bits stored at the destination and bits contained in an address header arriving with the data to be delivered. This matching function may be based on a modified Boolean-style comparison using NOT, AND and OR functions.

Additionally, a formatting system may be used to dynamically partition the flags used for such addressing to support selective multi-cast, based on setting individual flag bits to represent set membership (or groups). Further, addressing flags may be allocated in such a way to provide unique addresses to multiple destinations using a 'one hot' scheme. Further still, the addressing flags may be dynamically allocated. Also, a software system component may perform decision making to decide the correct allocation of flag bits between multicast and unique addressing, according to destination addresses of the data to be transmitted.

Per-Core ID Lists

Figure 9:
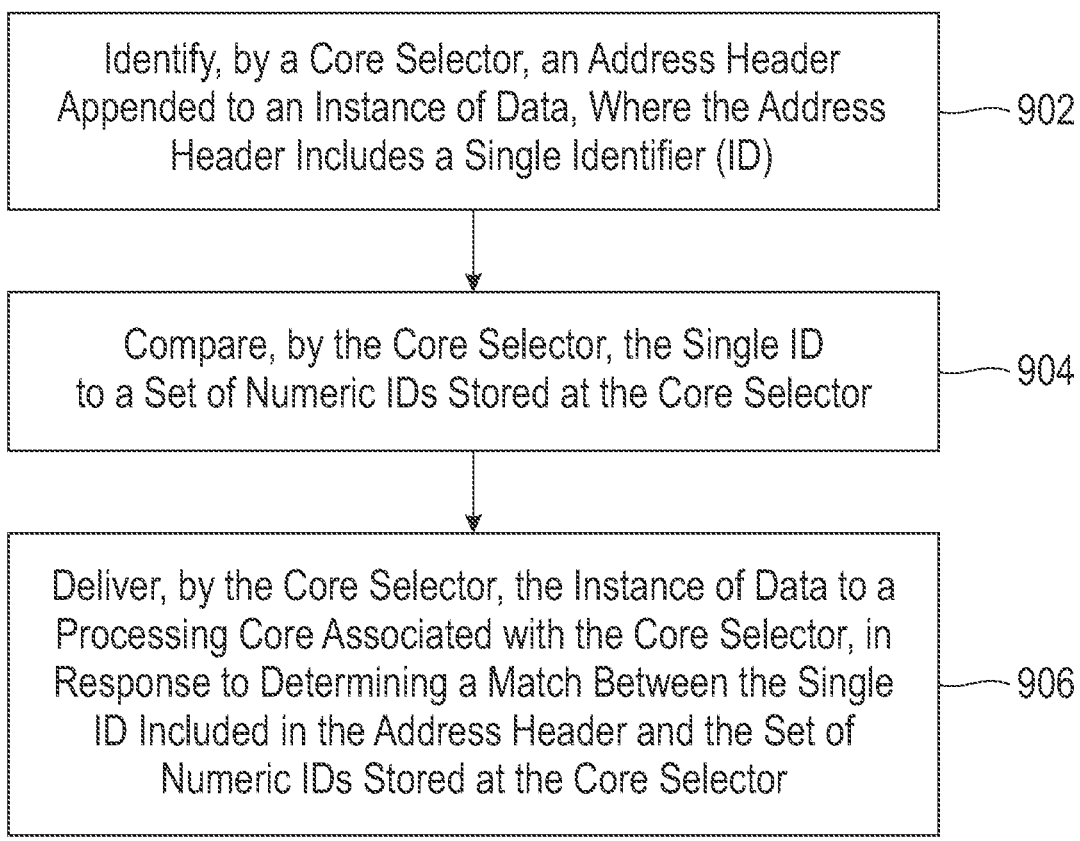
FIG. 9 illustrates a method for performing filtering using per-core ID lists, in accordance with one embodiment.

Now referring to FIG. 9, a flowchart of a method 900 for performing filtering using per-core ID lists is shown according to one embodiment. The method 900 may be performed in accordance with the present invention in any of the environments depicted in FIGS. 1-4, 6, 8, 12, and 14, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where an address header appended to an instance of data is identified by a core selector, where the address header includes a single identifier (ID). In one embodiment, the single ID may include a flag vector. Additionally, method 900 may proceed with operation 904, where the core selector compares the single ID to a set of numeric IDs stored at the core selector. In one embodiment, the set of numeric IDs may include a set of flag vectors stored by the core selector.

Further, method 900 may proceed with operation 906, where the core selector delivers the instance of data to a processing core associated with the core selector in response to determining a match between the single ID included in the address header and the set of numeric IDs stored at the core selector. In one embodiment, the instance of data is not delivered to the processing core associated with the core selector in response to determining no match between the single ID included in the address header and the set of numeric IDs stored at the core selector.

In one embodiment, each processing core may be assigned one or more non-unique numeric IDs. Additionally, data packets may contain a destination header ID, which may target multiple cores. Further, a compiler may need to do ID set assignment for each data stream. Further still, processing cores may match across their ID sets (like a cache tag lookup) and may check if data is destined for them.

Figure 10:
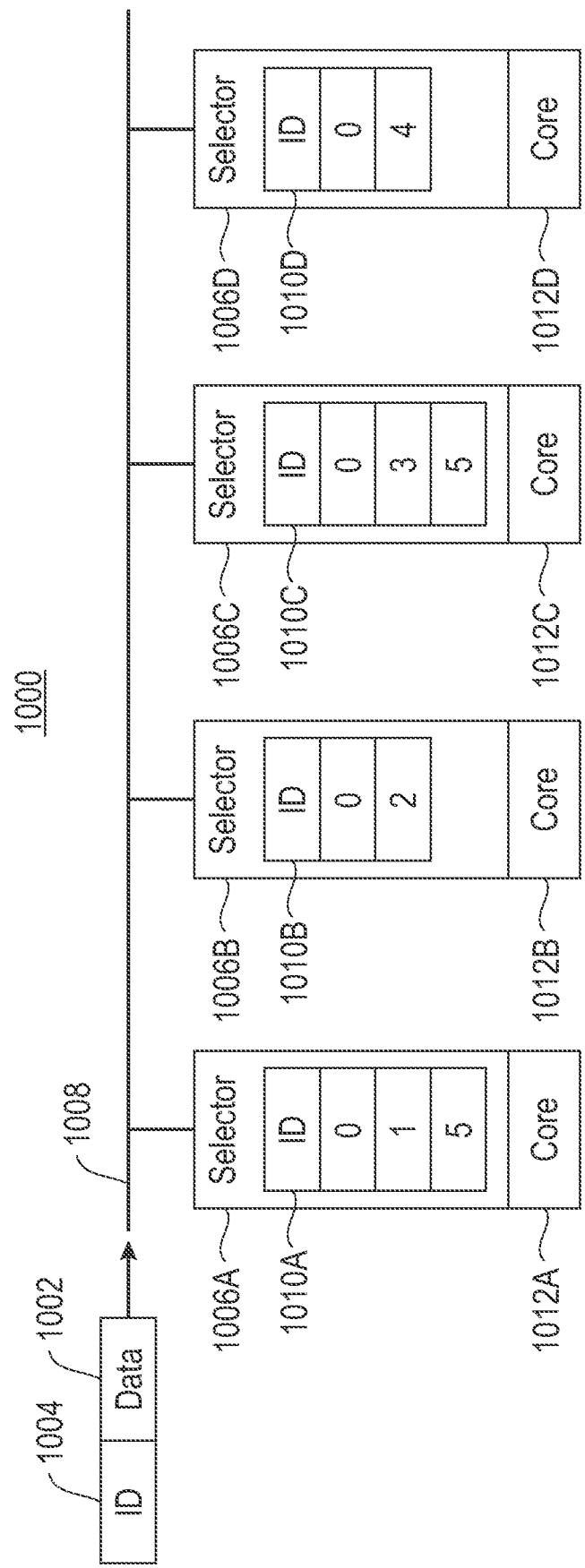
FIG. 10 illustrates an exemplary ID set implementation, in accordance with one embodiment.

FIG. 10 illustrates an exemplary ID set implementation 1000, according to one exemplary embodiment. As shown, an n-bit address header 1004 is appended to an instance of data 1002, and the address header 1004 and instance of data 1002 are sent to each of a plurality of core selectors 1006A-D located on a multicast bus 1008. Core selectors 1006A-D are each associated with a respective set of numeric IDs 1010A-D. In one embodiment, each respective set of numeric IDs 1010A-D may be stored in a LUT within the respective core selector 1006A-D.

As each of the plurality of core selectors 1006A-D receives the address header 1004 and instance of data 1002, the address header 1004 is searched for in the respective set of numeric IDs 1010A-D. One exemplary search includes the following pseudocode:

```
For any ID in Core_ID_LUT:
    "Core_ID_LUT(ID) =? Header_ID."
```

This search performs a binary comparison between the address header value "Header_ID" and every entry in the set of numeric IDs stored in the lookup table "Core_ID_LUT". The "ID" is an iterator index used to perform the comparison with each entry in the stored Core_ID_LUT.

If the address header 1004 is found in the one or more of the sets of numeric IDs 1010A-D, the instance of data 1002 may be delivered to the respective processing core 1012A-D.

For example, if the address header 1004 has a value of zero, the instance of data 1002 will be delivered by core selectors 1006A-D to all processing cores 1012A-D, since the value of zero is found in each set of numeric IDs 1010A-D. In another example, if the address header 1004 has a value of five, the instance of data 1002 will be delivered by the first core selector 1006A and the third core selector 1006C to their respective cores 1012A and 1012C, since the value of five is found in their respective sets of numeric IDs 1010A and 1010C.

In this way, with sufficiently large ID lists, any combination of processing core targets may be supported for each data instance that is distributed. Additionally, a number of bits needed for an ID field in address header may be reduced, resulting in more compact address headers.

Additionally, a hardware mechanism may filter delivery based on a comparison with a list of IDs, uniquely stored at each destination, with an ID in the address header. Further, a parallel-lookup memory may provide the result of an ID match in constant time. Further still, a software component may be provided for generating and allocating the unique IDs.

ID Lookup Table

Figure 11:
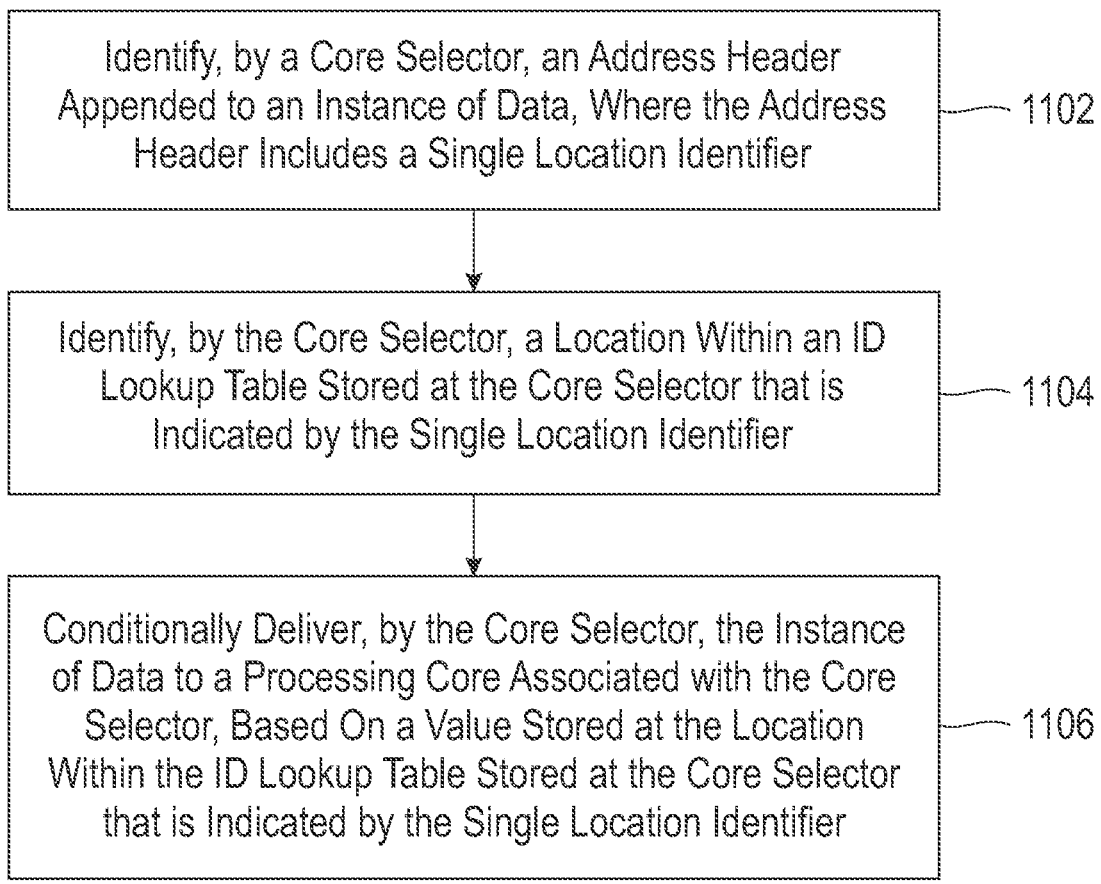
FIG. 11 illustrates a method for performing filtering using an ID lookup table, in accordance with one embodiment.

Now referring to FIG. 11, a flowchart of a method 1100 for performing filtering using an ID lookup table is shown according to one embodiment. The method 1100 may be performed in accordance with the present invention in any of the environments depicted in FIGS. 1-4, 6, 8, 12, and 14, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where an address header appended to an instance of data is identified by a core selector, where the address header includes a single location identifier. Additionally, method 1100 may proceed with operation 1104, where the core selector identifies a location within an ID lookup table stored at the core selector that is indicated by the single location identifier. Further, method 1100 may proceed with operation 1106, where the core selector conditionally delivers the instance of data to a processing core associated with the core selector, based on a value stored at the location within the ID lookup table stored at the core selector that is indicated by the single location identifier.

Additionally, in one embodiment, the instance of data may be delivered to the processing core in response to determining that the value is true. In another embodiment, the instance of data may not be delivered to the processing core in response to determining that the value is false.

In one embodiment, an address header ID may be sent with an instance of data. Additionally, each core selector may determine an address within a LUT stored at the core selector that matches the address header ID. Further, if an associated value at the matching address within the LUT is true, the core selector sends the instance of data to its associated processing core.

In this way, parallel match circuitry may be avoided, and a true/false bit may be used for every address header ID stored within the LUT of each core selector, thereby improving a speed of decision making by the core selector. In one embodiment, the address header ID length is log 2 the number of groups.

Figure 12:
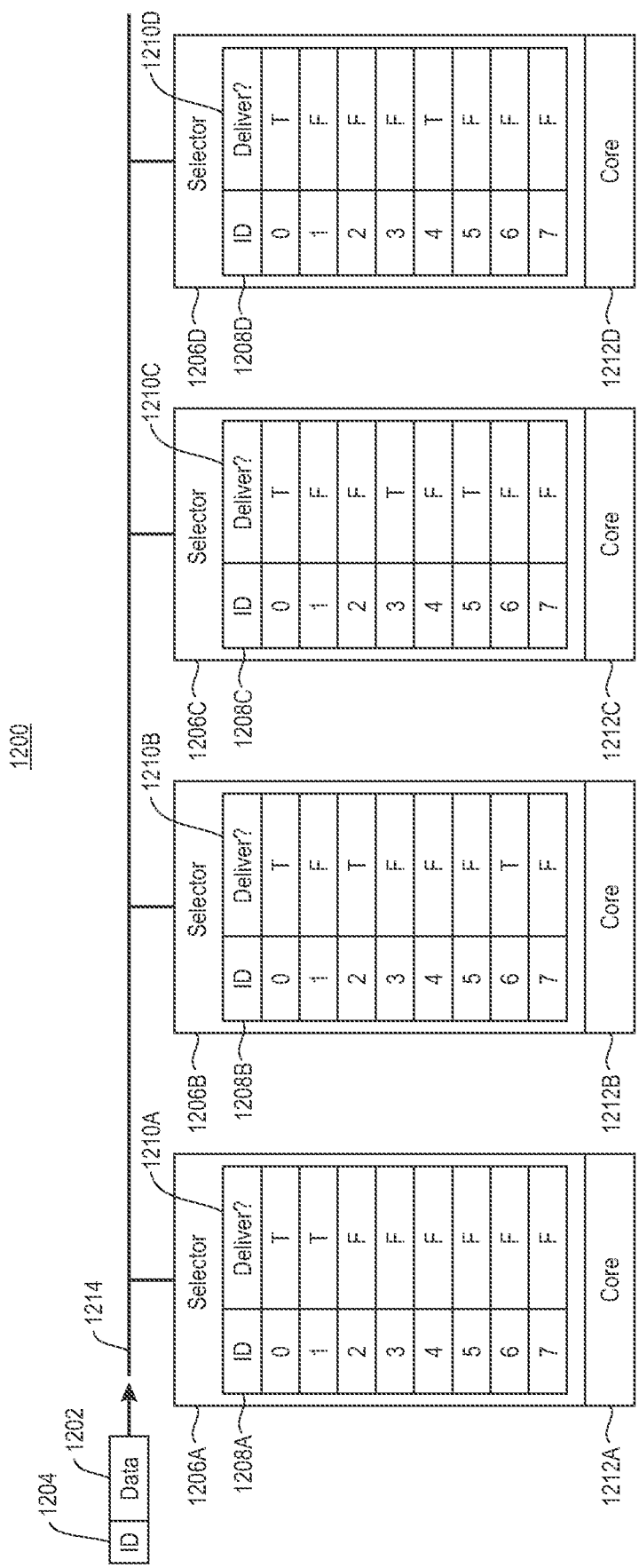
FIG. 12 illustrates an exemplary ID lookup table implementation, in accordance with one embodiment.

FIG. 12 illustrates an exemplary ID lookup table implementation 1200, according to one exemplary embodiment. As shown, an address header ID 1204 is appended to an instance of data 1202, and the address header ID 1204 and instance of data 1202 are sent to each of a plurality of core selectors 1206A-D located on a multicast bus 1214. Core selectors 1206A-D each store a respective lookup table including ID locations 1208A-D and associated boolean values 1210A-D.

As each of the plurality of core selectors 1206A-D receives the address header ID 1204 and instance of data 1202, an ID location 1208A-D matching the address header ID 1204 is identified within their respective lookup tables. For each core selector 1206A-D, if the associated boolean value 1210A-D at the matching ID location 1208A-D has a value of "true," the instance of data 1202 is delivered to the processing core 1212A-D associated with the core selector 1206A-D.

For example, if the address header ID 1204 has a value of zero, the instance of data 1202 will be delivered by core selectors 1206A-D to all processing cores 1212A-D, since for each core selector 1206A-D, location zero within the ID location 1208A-D has an associated boolean value 1210A-D of "true." In another example, if the address header ID 1204 has a value of one, the instance of data 1202 will be delivered only by core selector 1206A to its processing core 1212A, since only location one within the ID location 1208A of core selector 1206A has an associated boolean value 1210A of "true."

In this way, a hardware mechanism may filter delivery based on the state of one or more IDs, uniquely stored at each destination, indexed by the ID in the address header. Additionally, the flags may be contained in a linear lookup table, indexed by the address header ID, each entry of which holds a binary true/false match result.

ID Lookup Vector

Figure 13:
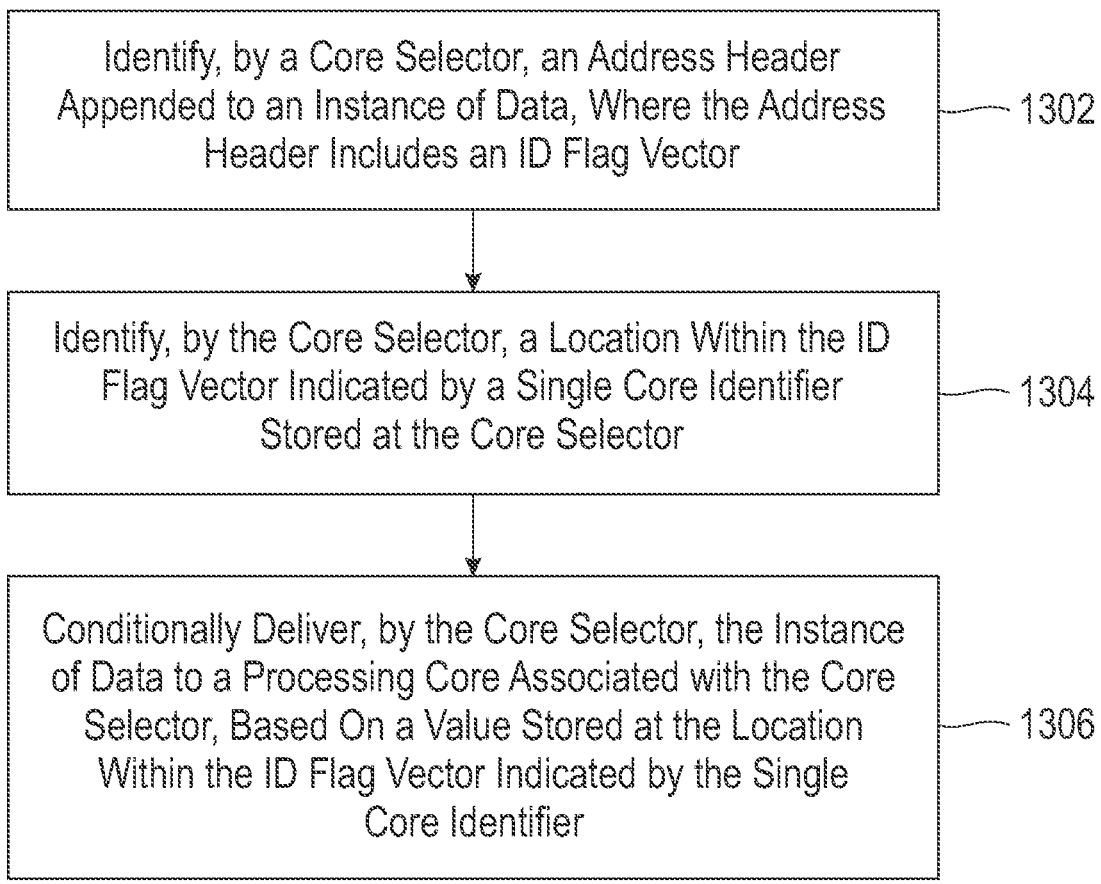
FIG. 13 illustrates a method for performing filtering using an ID lookup vector, in accordance with one embodiment.

Now referring to FIG. 13, a flowchart of a method 1300 for performing filtering using an ID lookup vector is shown according to one embodiment. The method 1300 may be performed in accordance with the present invention in any of the environments depicted in FIGS. 1-4, 6, 8, 12, and 14, among others, in various embodiments. Of course, more or less operations than those specifically described in FIG. 13 may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 13, method 1300 may initiate with operation 1302, where an address header appended to an instance of data is identified by a core selector, where the address header includes an ID flag vector. In one embodiment, the ID flag vector may include a plurality of flag bits. Additionally, method 1300 may proceed with operation 1304, where the core selector identifies a location within the ID flag vector indicated by a single core identifier stored at the core selector. Further, method 1300 may proceed with operation 1306, where the core selector conditionally delivers the instance of data to a processing core associated with the core selector, based on a value stored at the location within the ID flag vector indicated by the single core identifier.

Additionally, in one embodiment, the instance of data may be delivered to the processing core in response to determining that the value is true. In another embodiment, the instance of data may not be delivered to the processing core in response to determining that the value is false.

In one embodiment, each core selector may include single core identifier, and the address header appended to an instance of data may include an associated ID flag vector. Each core identifier may indicate which flag bit to look at within the ID flag vector. If the associated flag bit has a value of true, then the instance of data is delivered by the core selector to its associated processing core. If the associated flag bit has a value of false, then the instance of data is delivered by the core selector to its associated processing core.

In this way, a single lookup may be performed, and the ID flag vector may be stored at the instance of data itself instead of the core selectors, which may reduce an amount of data stored at the core selectors. In another embodiment, a broadcast to all cores on a multicast bus may be implemented by setting all flags to "true" within the ID flag vector. In yet another embodiment, a length of the ID flag vector may be equal to a number of processing cores along the bus.

Figure 14:
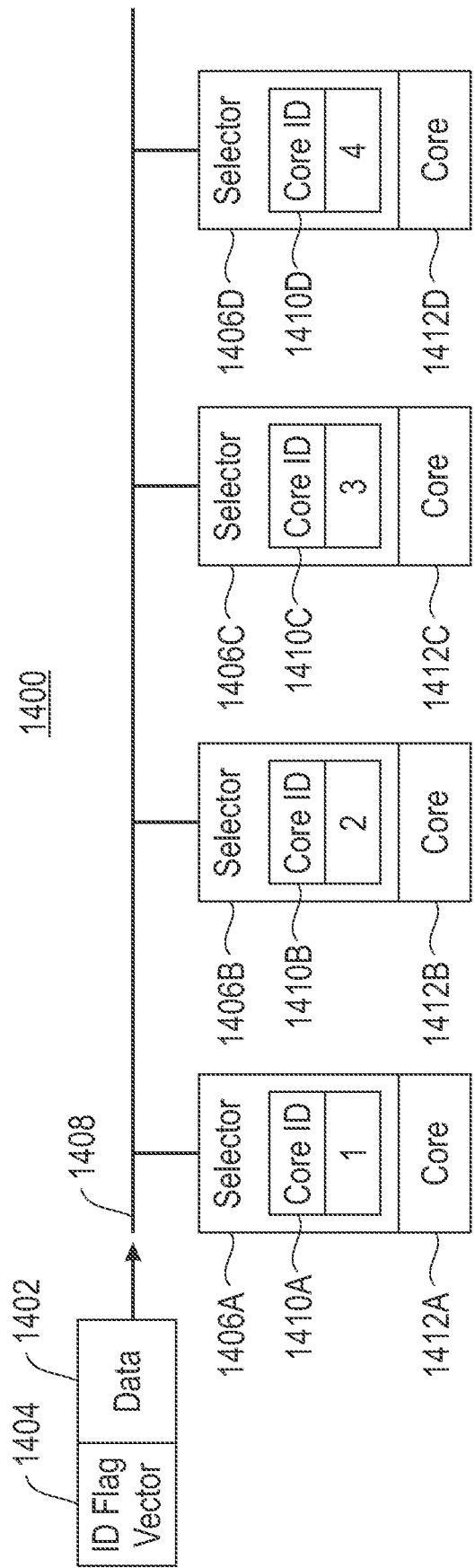
FIG. 14 illustrates an exemplary ID lookup vector implementation, in accordance with one embodiment.

FIG. 14 illustrates an exemplary ID lookup vector implementation 1400, according to one exemplary embodiment. As shown, an address vector 1404 is appended to an instance of data 1402, and the address vector 1404 and instance of data 1402 are sent to each of a plurality of core selectors 1406A-D located on a multicast bus 1408. Core selectors 1406A-D each store a respective core identifier 1410A-D.

As each of the plurality of core selectors 1406A-D receives the address vector 1404 and instance of data 1402, a location within the address vector 1404 is determined that matches the respective core identifier 1410A-D. For each core selector 1406A-D, if the matching location within the address vector 1404 has a value of "true," the instance of data 1402 is delivered to the processing core 1412A-D associated with the core selector 1406A-D.

For example, if the address vector 1404 has a value of "1111", the instance of data 1402 will be delivered by core selectors 1406A-D to all processing cores 1412A-D, since for each core identifier 1410A-D within the address vector 1404, the matching location within the address vector 1404 has a value of "true." In another example, if the address vector 1404 has a value of "1000", the instance of data 1402 will be delivered by only core selector 1406A to its processing core 1412A, since only core identifier 1408A has a value of "true" within the address vector 1404.

In this way, a hardware mechanism may filter delivery based on one or more IDs, uniquely stored at each destination, that index into the state of the ID flag set in the address header. Additionally, each of N destinations may contain only a single, globally unique ID and the address header may contain (N×1-bit flags) representing desired delivery at each of the N destinations.

Table 2 illustrates a comparison of various distribution system approaches. Of course, it should be noted that the comparison shown in Table 2 is set forth for illustrative purposes only, and thus should not be construed as limiting in any manner. In Table 2, the number of unique IDs is equal to the number of destinations along the multicast bus.

TABLE 2

| PARAMETER | Boolean atching | Per-Core ID Lists | ID Lookup Table | ID Lookup Vector |
|---|---|---|---|---|
| ID range supportable | Small | Large | Medium | Full ($2^N$) |
| Instruction address bits needed | = <number of flags> ~= <number groups> | = log_2 <number unique IDs> | = log_2 <number unique IDs> | = <number unique IDs> |
| Decode speed | Very fast | Medium | Medium-Fast | Fast |
| Compiler additional complexity | Low | High | High | n/a |
| Core logic used to implement | Combinatorial | Memory (small # entries, parallel lookup) | Memory (large # entries, single lookup) | Combinatorial |

N-Dimension Distribution

Figure 15:
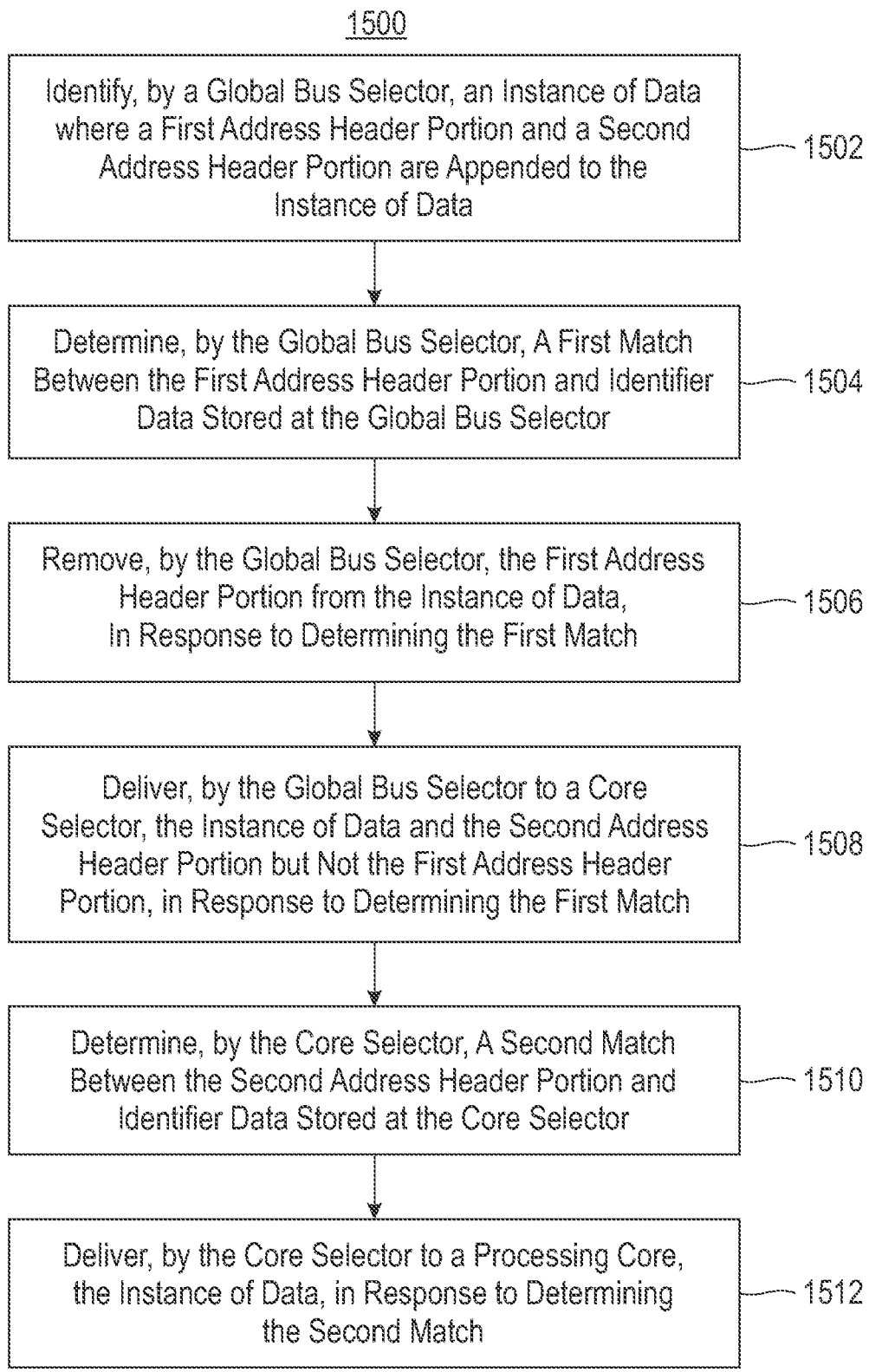
FIG. 15 illustrates a method for performing N-dimensional distribution, in accordance with one embodiment.

Now referring to FIG. 15, a flowchart of a method 1500 for performing N-dimensional distribution is shown according to one embodiment. The method 1500 may be performed in accordance with the present invention in any of the environments depicted in FIGS. 1-4, 6, 8, 12, and 14, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 15, method 1500 may initiate with operation 1502, where an instance of data is identified by a global bus selector, where a first address header portion and a second address header portion are appended to the instance of data. Additionally, method 1500 may proceed with operation 1504, where the global bus selector determines a first match between the first address header portion and identifier data stored at the global bus selector. Further, method 1500 may proceed with operation 1506, where the global bus selector removes the first address header portion from the instance of data, in response to determining the first match.

Further still, method 1500 may proceed with operation 1508, where the global bus selector delivers the instance of data and the second address header portion, but not the first address header portion, to a core selector, in response to determining the first match. In one embodiment, the global bus selector may deliver the instance of data and the second header portion to a local bus containing the core selector. In another embodiment, additional core selectors may reside on the local bus as well.

Also, method 1500 may proceed with operation 1510, where a second match is determined by the core selector between the second address header portion and identifier data stored at the core selector. In addition, method 1500 may proceed with operation 1512, where the instance of data is delivered by the core selector to a processing core, in response to determining the second match. In one embodiment, the processing core may be associated with/linked to the core selector.

In this way, multiple dimension routing may be supported with the above schemes, with no upper limit of dimensionality. In one embodiment, address header bits may be generated for each dimension independently. These bit sets may be concatenated in an order of the dimensions to be traversed. At each dimension, the distribution logic (e.g., a selector) may consider the first (e.g., outwardmost) set of address header bits, and may then remove the bits from the traffic before forwarding it. In this way, bits are stripped off like peeling an onion.

Additionally, the interconnect may be multi-dimensional (dim>1) and the data may be selectively distributed along each dimension, with the data to be distributed hierarchically packed according to one of the schemes outlined above, and automatically unpacked at the termination of routing in each dimension (like multi-hop onion routing).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for performing selective multicast delivery, the computer program product comprising a computer readable storage medium having program instructions embodied therewith, wherein the computer readable storage medium is not a transitory signal per se, the program instructions executable by a selector of an intelligent processing unit (IPU) to cause the selector to perform a method comprising:
   identifying, by the selector, an address header appended to an instance of data, the address header including one or more Boolean operation bits, and one or more Boolean flag selection bits;
   performing, by the selector, a Boolean match operation between the one or more Boolean flag selection bits and an identifier flag stored at the selector, as specified by the Boolean operation bits; and
   conditionally delivering, by the selector, the instance of data, based on results of the Boolean match operation.

2. The computer program product of claim 1, wherein the selector is one of a plurality of selectors implemented within a neural inference processing device.

3. The computer program product of claim 1, wherein the selector includes a core selector located on a multicast bus of a neural inference processing device, and the selector determines whether to pass incoming instances of data to a processing core associated with the core selector.

4. The computer program product of claim 1, wherein the selector includes a global bus selector located on a global bus of a neural inference processing device, and the selector determines whether to pass incoming instances of data to a local bus associated with the global bus selector.

5. The computer program product of claim 1, wherein:
   in response to determining that the Boolean match operation results in a match at the selector, the selector delivers the instance of data, and in response to determining that the Boolean match operation does not result in a match at the selector, the selector does not deliver the instance of data.

6. The computer program product of claim 5, wherein the Boolean operation bits include a negation bit, and an OR/AND combiner bit.

7. The computer program product of claim 1, wherein the Boolean match operation is performed utilizing configurable logic implemented in hardware of a neural inference processing device.

8. The computer program product of claim 1, wherein delivering the instance of data includes passing the instance of data to another bus.

9. The computer program product of claim 1, wherein delivering the instance of data includes passing the instance of data to a processing core.

10. The computer program product of claim 1, wherein:
the address header includes a first portion and a second portion, and
the first portion of the address header is removed by the selector before delivering the instance of data and the second portion of the address header to a second selector.

11. A computer program product for performing selective multicast delivery, the computer program product comprising a computer readable storage medium having program instructions embodied therewith, wherein the computer readable storage medium is not a transitory signal per se, the program instructions executable by a selector of an intelligent processing unit (IPU) to cause the selector to perform a method comprising:
identifying, by the selector, an address header appended to an instance of data, the address header including a single identifier comprising one or more bits;
performing, by the selector, a lookup for the single identifier within one or more numeric identifiers stored at the selector; and
conditionally delivering, by the selector, the instance of data, based on results of the lookup.

12. The computer program product of claim 11, wherein the selector is one of a plurality of selectors implemented within a neural inference processing device.

13. The computer program product of claim 11, wherein the selector includes a core selector located on a multicast bus of a neural inference processing device, and the selector determines whether to pass incoming instances of data to a processing core associated with the core selector.

14. The computer program product of claim 11, wherein:
the instance of data is delivered in response to determining that the single identifier is found within the one or more numeric identifiers, and
the instance of data is not delivered in response to determining that the single identifier is not found within the one or more numeric identifiers.

15. The computer program product of claim 11, wherein the selector includes a global bus selector located on a global bus of a neural inference processing device, and the selector determines whether to pass incoming instances of data to a local bus associated with the global bus selector.

16. The computer program product of claim 11, wherein delivering the instance of data includes passing the instance of data to another bus.

17. A computer program product for performing selective multicast delivery, the computer program product comprising a computer readable storage medium having program instructions embodied therewith, wherein the computer readable storage medium is not a transitory signal per se, the program instructions executable by a selector of an intelligent processing unit (IPU) to cause the selector to perform a method comprising:
identifying, by the selector, an address header appended to an instance of data, the address header including a single location identifier comprising one or more bits;
performing, by the selector, a lookup for a location within an identifier lookup table stored at the selector that is indicated by the single location identifier; and
conditionally delivering, by the selector, the instance of data, based on results of the lookup.

18. The computer program product of claim 17, wherein:
the instance of data is delivered in response to determining that the location within the identifier lookup table that is indicated by the single location identifier has a Boolean value of true, and
the instance of data is not delivered in response to determining that the location within the identifier lookup table that is indicated by the single location identifier has a Boolean value of false.

19. The computer program product of claim 17, wherein the selector is one of a plurality of selectors implemented within a neural inference processing device.

20. The computer program product of claim 17, wherein the selector includes a global bus selector located on a global bus of a neural inference processing device, and the selector determines whether to pass incoming instances of data to a local bus associated with the global bus selector.

* * * * *